(No Model.)
C. A. E. MEINICKE.
SIZING APPARATUS FOR SLIME, &c.
No. 446,149. Patented Feb. 10, 1891.
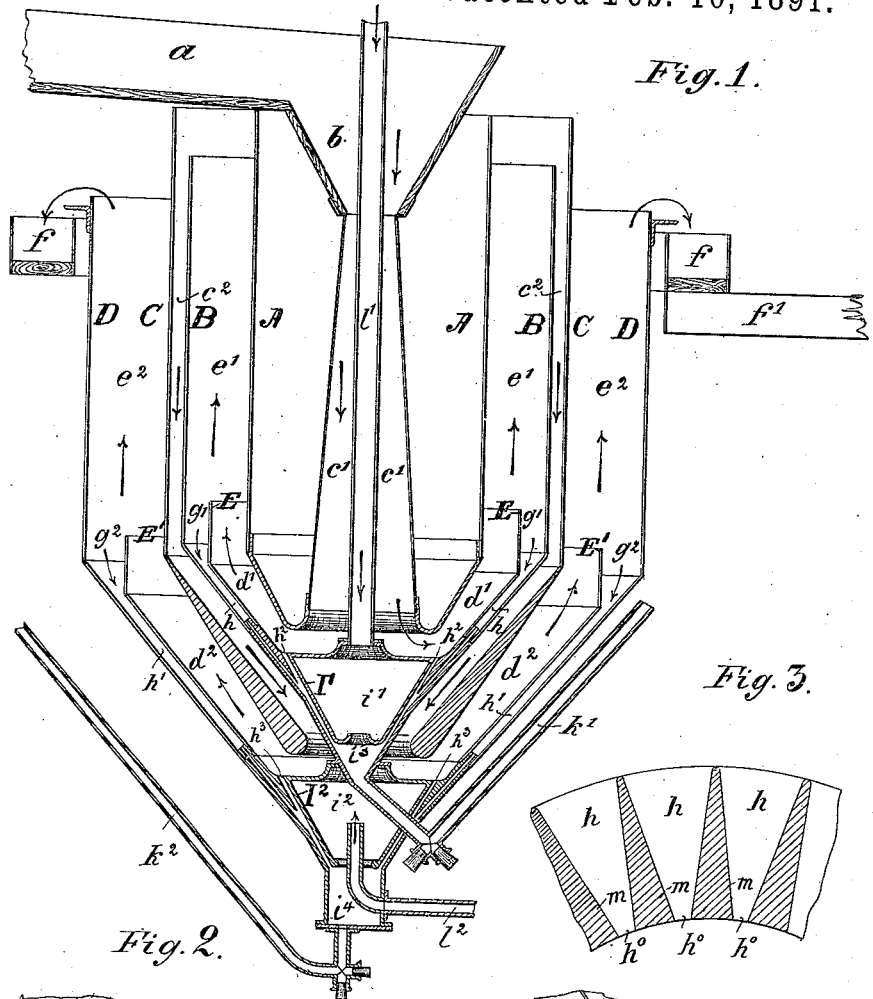
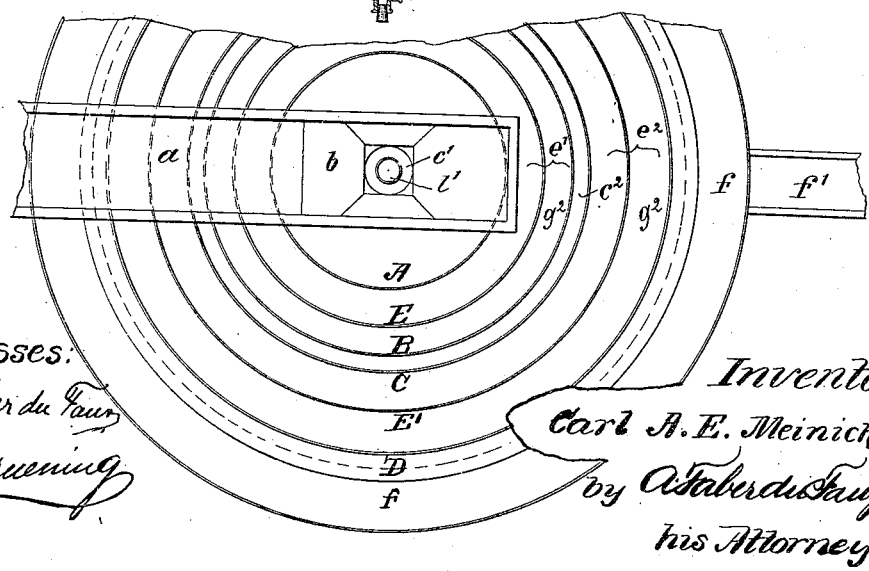
Witnesses:
A. Faber du Faur
Wm Bruening
Inventor.
Carl A. E. Meinicke,
by A. Faber du Faur,
his Attorney

UNITED STATES PATENT OFFICE.

CARL AUGUST EMIL MEINICKE, OF CLAUSTHAL, PRUSSIA, GERMANY.

SIZING APPARATUS FOR SLIME, &c.

SPECIFICATION forming part of Letters Patent No. 446,149, dated February 10, 1891.

Application filed October 29, 1890. Serial No. 369,758. (No model.) Patented in Germany August 29, 1888, No. 47,025, and in Austria-Hungary August 16, 1889, No. 35,790 and No. 59,062.

*To all whom it may concern:*

Be it known that I, CARL AUGUST EMIL MEINICKE, a subject of the King of Prussia, residing at Clausthal, in the Kingdom of Prussia, Germany, have invented new and useful Improvements in Sizing Apparatus for Slime and the Like, of which the following is a specification.

My invention has reference to hydraulic slime-classifiers; and it consists, essentially, in a series of concentric vessels provided with conical lower ends forming between them channels for the mixed ore and water, discharge-channels for each class of ore, sediment-chambers, discharge-pipes, and water-supply pipes for producing an inverse current, all of which is more fully pointed out in the following specification and claims and illustrated in the accompanying drawings, in which—

Figure 1 is a vertical central section of an apparatus embodying my invention. Fig. 2 is a plan or top view of the same, part being broken away. Fig. 3 is a section of a modified form of part of the apparatus.

Similar letters indicate corresponding parts.

In the drawings, the letters A, B, C, and D designate a series of concentric vessels having their lower ends made conical.

E and E' are two conical partitions placed concentrically within the conical ends of the vessels B and D, respectively, said partitions being also provided with short cylindrical portions extending into the cylindrical parts of the vessels B and D.

I' and I² are cones open at their apexes only, placed within the extreme lower ends of the vessels B and D, the interior of said cones forming the water-chambers $i'$ and $i^2$.

$i^3$ and $i^4$ are the sediment-chambers, formed at the lower conical ends of the concentric vessels B and D.

$c'$ is the inlet-pipe for the mixed slime and water, which pipe is located centrally within the vessel A and is secured at its lower end to the lower end of said vessel. The walls of this inlet-pipe are conical—that is to say, flare downwardly.

$a$ is a feed-trough, and $b$ a funnel for conducting the mixed slime and water to the inlet-pipe.

$k'$ is a discharge-pipe leading from the sediment-chamber $i^3$, and $k^2$ a similar pipe leading from the sediment-chamber $i^4$.

$f$ is the annular overflow extending around the upper edge of the vessel D, and $f'$ is the discharge-trough leading therefrom.

The upper or cylindrical portions of the concentric vessels A, B, C, and D form between them the two concentric channels $e'$ and $e^2$ and an intermediate downtake $c^2$, while their lower or conical portions, in connection with the partitions E and E' and the cones I' and I², form the concentric channels $d'$ and $d^2$, the sediment-pockets $g'$ and $g^2$, the passages $h$ and $h'$, communicating, respectively, with the pockets $g'$ and $g^2$ and the sediment-chambers, and the passages $h^2 h^3$, joining the channels $d' d^2$ with the passages $h$ and $h'$. It will be noticed that the channel $e^2$ is greater in area of horizontal cross-section than the channel $e'$, and that the channels $d'$ and $d^2$ increase in cross-section from the bottom up.

$l'$ is an induction-pipe passing through the inlet-pipe $c'$ and communicating with the chamber $i'$ in the cone I', and $l^2$ is a similar induction-pipe entering the chamber $i^2$ in cone I² from below.

The mixed slime and water entering the inlet $c'$, passes through the conical channel $d'$ and rises in the channel $e'$. From thence it passes into the downtake $c^2$ and rises in the channels $d^2$ and $e^2$, and finally passing into the overflow $f$. The heavier or larger particles of ore are deposited from the channel $e'$ into the pocket $g'$, pass through the passage $h$ to the sediment-chamber $i^3$, and are conducted away by the discharge-pipe $k'$. The next class falls into the pocket $g^2$ and passes through the passage $h'$ to the sediment-chamber $i^4$, from which it is conducted by the pipe $k^2$. The lightest particles pass over the upper edge of the vessel D and fall into the overflow $f$. In working the apparatus in this manner smaller or lighter particles of ore are always deposited with the larger and heavier particles, and in order therefore to keep the several classes distinct I make use of a current of water introduced into the apparatus to flow in a direction contrary to the settling of the ore. The water introduced at the pipes $l'$ and $l^2$ enters the respective chambers $i'$ and $i^2$ and flows through the passages $h^2$ $h^3$ in a direction opposite to the descending particles of ore and carries the lighter particles of ore into the channels $d'$ and $d^2$, and consequently back to the upward currents in the channels $e'$ and $e^2$.

The passages $h$ $h^2$ and $h'$ $h^3$ are of the same cross-section at their juncture; but at their outlets and inlets the said passages may be of any suitable cross-section. The relation may either be such that the clear water enters the passages $h$ and $h'$ with less speed than it escapes from the passages $h^2$ and $h^3$, or vice versa. The said passages $h$ and $h'$ may extend over the entire circumference, or, preferably, they may be contracted, as shown in Fig. 3, by means of solid portions, such as $m$, thus transforming them into a series of small isolated channels $h°$, whereby the quantity of clear water necessary is considerably diminished.

The apparatus shown in the drawings is intended for separating the slime into two classes. However, it is evident that by increasing the number of parts the slime can be separated into a greater number.

By the peculiar construction and arrangement of the parts I am enabled to combine in a single apparatus occupying a small space all the compartments formerly used and occupying a very large space, and, furthermore, the mixed water and slime is distributed quite uniformly in all parts of the apparatus, since the spaces increase from the center toward the exterior, and the purification by the clear water also takes place uniformly.

What I claim as new, and desire to secure by Letters Patent, is—

1. In a slime-classifier, a series (two or more) of concentric vessels provided with conical ends and forming annular channels for the passage of the mixed ore and water, a central inlet-pipe, and a series of conical partitions forming the sediment pockets, chambers, and passages for the discharge of the class or classes, substantially as described.

2. In a slime-classifier, a series of concentric vessels provided with conical ends and forming channels for the passage of the mixed ore and water, a central inlet-pipe, a series of interpolated conical partitions forming the sediment-pockets, sediment-chambers, and passages for the mixed ore and water, and induction-pipes for the introduction of clear water, substantially as described.

3. In a slime-classifier, a series of concentric vessels provided with conical ends and forming channels for the passage of the mixed ore and water, a central inlet-pipe, a series of conical partitions forming the sediment-pockets, sediment-chambers, and passages for the mixed ore and water, induction-pipes for the introduction of clear water, and an overflow, substantially as described.

4. In an apparatus of the character specified, a series of concentric vessels having conical ends and forming a channel for the passage of the mixed ore and water, an inlet-pipe for introducing the water to the central part of the apparatus, and a partition, as E, and cone I′, forming with the vessels the channel $d'$ and passage $h$, substantially as described.

In testimony whereof I have signed my name to this specification in the presence of two subscribing witnesses.

CARL AUGUST EMIL MEINICKE.

Witnesses:
 FREDRICH CARL GLASER,
 G. HÜLSMANN.